United States Patent [19]
Fox

[11] Patent Number: 5,333,912
[45] Date of Patent: Aug. 2, 1994

[54] TRACK SWITCH SNOW MELTER DUCT SYSTEM WITH QUICK RELEASE JOINTS

[75] Inventor: David K. Fox, Wayzata, Minn.

[73] Assignee: Railway Equipment Company, Inc., Delano, Minn.

[21] Appl. No.: 944,709

[22] Filed: Sep. 18, 1992

[51] Int. Cl.⁵ ............................................. F16L 35/00
[52] U.S. Cl. ...................... 285/39; 285/309; 285/310; 285/320; 285/421
[58] Field of Search ................ 285/39, 309, 325, 421, 285/310, 320, 328

[56] References Cited

U.S. PATENT DOCUMENTS

| | | | |
|---|---|---|---|
| 323,317 | 7/1885 | Goodrich et al. | 285/325 X |
| 3,463,518 | 8/1969 | Broussard et al. | 285/340 X |
| 3,583,731 | 6/1971 | Jewell | 285/325 X |
| 3,941,409 | 3/1976 | Rameau | 285/325 X |
| 5,188,399 | 2/1993 | Durina | 285/309 |

FOREIGN PATENT DOCUMENTS

| | | | |
|---|---|---|---|
| 0862370 | 3/1941 | France | 285/325 |
| 1223094 | 6/1960 | France | 285/325 |
| 0156182 | 9/1956 | Sweden | 285/305 |
| 9008288 | 7/1990 | World Int. Prop. O. | 285/309 |

OTHER PUBLICATIONS

Brochure entitled "Model 933 Magnum TM Hot Air Blower Track Switch Snow Melter System" by Railway Equipment Co. (published on a date prior to Apr. 1992).

Primary Examiner—Randolph A. Reese
Assistant Examiner—Heather Chun
Attorney, Agent, or Firm—Merchant, Gould, Smith, Edell, Welter & Schmidt

[57] ABSTRACT

The present invention is directed toward a quick release cam locking joint for connecting adjacent ducts for a track switch snow melter. The invention also includes a track duct support bracket for holding track switch snow melter track ducts.

11 Claims, 9 Drawing Sheets

TRACK SWITCH SNOW MELTER DUCT SYSTEM WITH QUICK RELEASE JOINTS

TECHNICAL FIELD

This invention relates to the field of hot air blower-type track switch snow melters, and more particularly to the duct work thereof.

BACKGROUND OF THE INVENTION

Hot air blower-type track switch snow melters have become standard equipment for railroads operating in cold climates. For those railroads, snow and ice buildup at track switches is a problem and track switch snow melters have become the solution of choice. With track switch snow melters, rather than laboriously clearing switches of snow by hand, this task can be done automatically.

Track switch snow melters generally have a plurality of snow sensors that detect the presence of snow in switching areas. These sensors relay a signal to a control panel on a heat source or blower unit. When snow is detected, hot air is blown through a system of ducts which direct a stream of hot air through various nozzles and outlets to critical areas of the switch which must be kept free of snow and ice.

The placement of the duct work is a difficult and critical aspect of the installation of hot air blowers. The ducts must be both proximate the rails so that the hot air can melt the snow and ice around them and at the same time not obstruct passing trains. One arrangement that has been used to accomplish these dual objectives is to place a first duct running from the heat source parallel and between two ties and beneath the rails of the track. From this first duct, low profile nozzles have been extended to direct hot air at critical parts of the switching mechanism. In addition to nozzles, additional ducts have been extended from the first duct perpendicular to the ties and parallel to the rails. These ducts are placed above the ties. Straps have been used to bolt these ducts to the ties. Ports or openings along the sides of the ducts directed air to areas to be kept clear of snow and ice.

Although the track switch snow melters have been important labor savers for keeping track switches clear of snow and ice, the duct work must be removed whenever the track is routinely maintained. With prior configurations of the duct work, this was a time-consuming process. In particular, the first duct had to be pulled out from between the ties in one segment. This segment was approximately as long as one of the ties. Considerable effort was required to slide the segment out because of friction created between the sides of the segment and the ballast. Flanges protruding from the segment also engaged the ballast making it difficult to slide out the segment.

SUMMARY OF THE INVENTION

The present invention is directed at a quick release cam locking joint and a track duct support bracket to decrease the labor required for removing the duct work from the railway when track maintenance is conducted. The typical quick release cam locking joint has a single flange proximate one end of a conduit and a compound flange proximate one end of another conduit. The compound flange has a primary flange and a plurality of oppositely disposed secondary flanges. The single flange is insertable between the primary flange and the secondary flanges of the compound flange. Cam rods are insertable between the single flange and each of the secondary flanges. The cam rod can be rotated to push against the secondary flanges and push the single flange toward the primary flange to join one conduit with the other.

A track duct support bracket is also included, having a base attached to a railroad tie. The support bracket also has a hold-down strap for placing over a track duct. Springs having one end attached to the base have a hook proximate an opposite end. The hook operatively connects to the hold-down strap for biasing the hold-down strap toward the base.

DETAILED DESCRIPTION OF THE PREFERRED EMBODIMENTS

Figure 1:
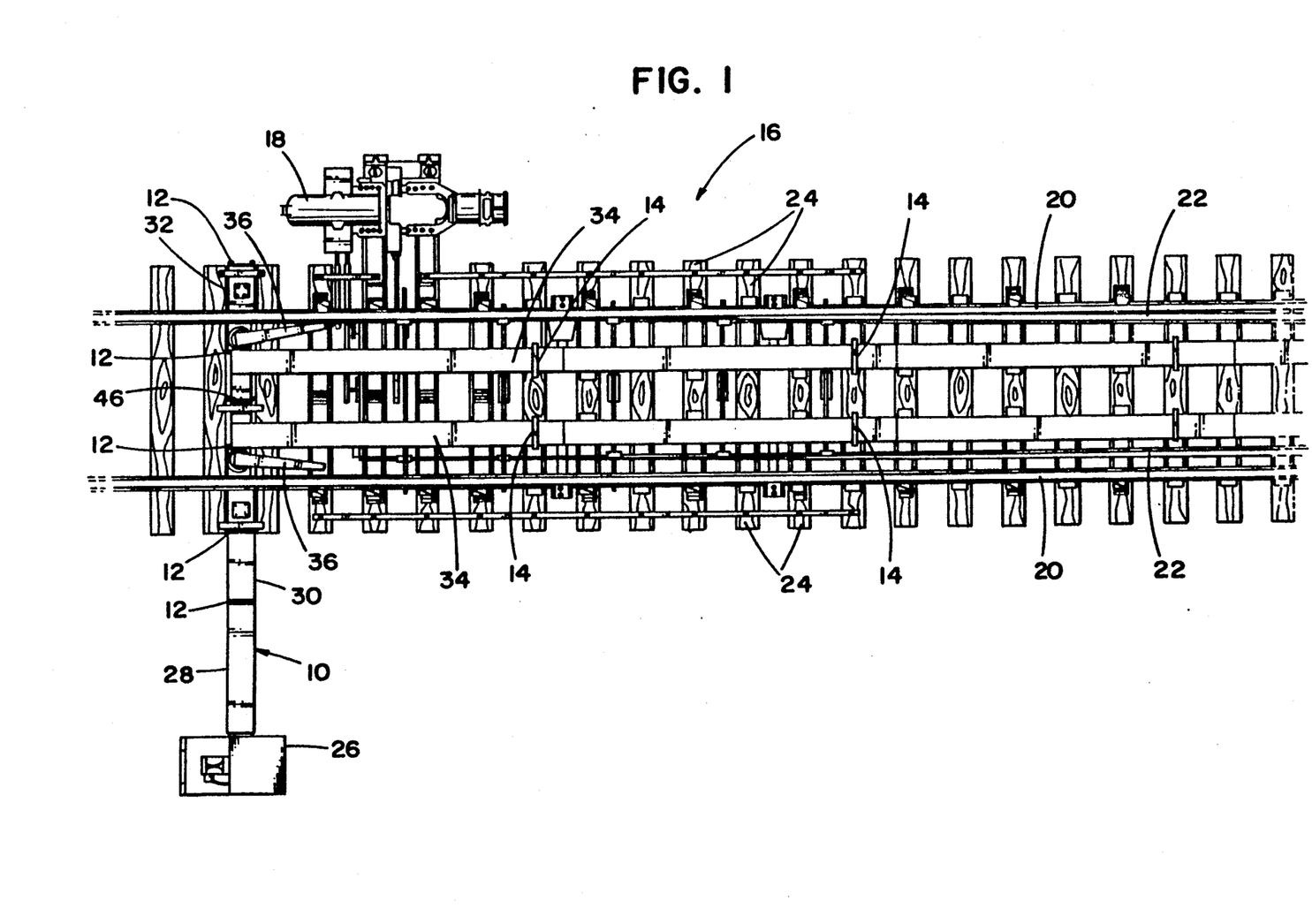
FIG. 1 shows a railway track switch equipped with a hot air blower-type track switch snow melter incorporating quick release cam locking joints and track duct support brackets.

Referring now to the drawings wherein like referenced numerals designate identical or corresponding parts through the several views, and more particularly to FIG. 1, referred to generally as 16 is a railway track switch. Shown in FIG. 1 is a hot air blower-type track switch snow melter, generally referred to as 10, incorporating a plurality of quick release cam locking joints 12 and track duct support brackets 14.

The switch includes an actuator 18, two stationary rails 20 and two slidably mounted rails, referred to as switching points 22. The stationary rails 20 are held in place by a plurality of ties 24. The ties 24 are generally embedded in and supported by a crushed aggregate railway bed or ballast (not shown). As well known to those skilled in the art, the switching points 22 can be slid horizontally so that one of the switching points or the other is engaged with the proximate stationary rail in order to direct a passing train onto one of two tracks.

Hot air blower 10 includes a main blower unit 26. The main blower unit 26 can be either gas fired or have an electric heating element. Leading from the main blower unit 26 is a flame duct 28 which leads to an offset duct 30 and then to an outlet duct 32. Mounted to the outlet duct 32 are two track ducts 34 and two point nozzles 36.

Figure 2:
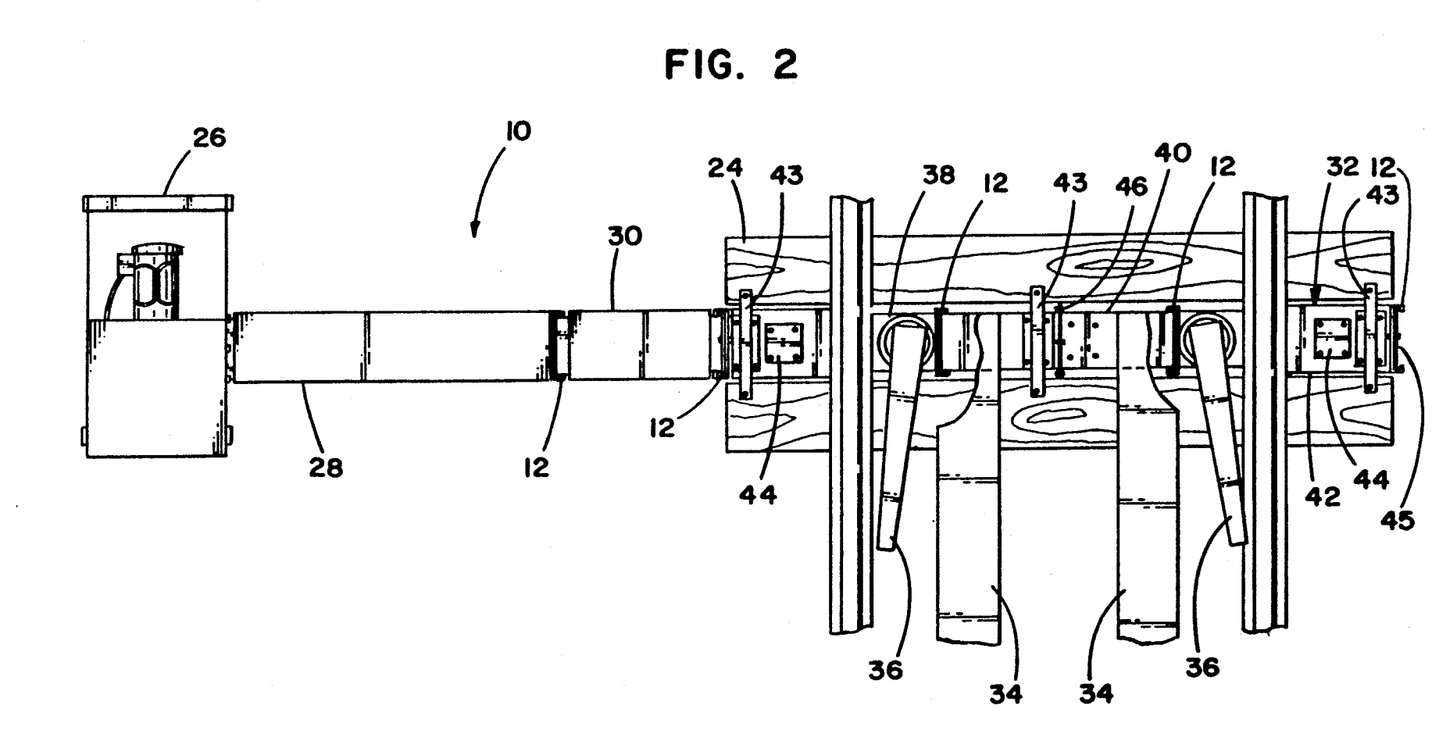
FIG. 2 shows a partial plane view of the hot air blower-type track switch snow melter.

FIG. 2 shows a partial plan view of hot air blower 10. Five cam locking joints 12 in accordance with the present invention are also shown. From left to right, as shown in FIG. 2, the first of the cam locking joints 12 connects the flame duct 28 to the offset duct 30. The next cam locking joint connects the offset duct 30 with the outlet duct 32. The outlet duct 32 is preferably in three sections. From left to right, these sections are a first section 38, a center section 40 and an end section 42. A plate 45 seals the distal end of end section 42. Duct 32 is held in position by a plurality of straps 43 fastened to ties 24.

Extending from the first section 38 of the outlet duct 32 is one point nozzle 36. The other point nozzle 36 extends from end section 42. Extending from center section 40, in the preferred embodiment, are two track ducts 34 (shown here partially cut away). Ducts 34 have side ports (not shown) for directing hot air at the track switch. As an alternative embodiment, track ducts 34 can be placed outside the tracks and over the openings revealed in outlet duct 32 once track duct plates 34 have been removed.

Figure 3:
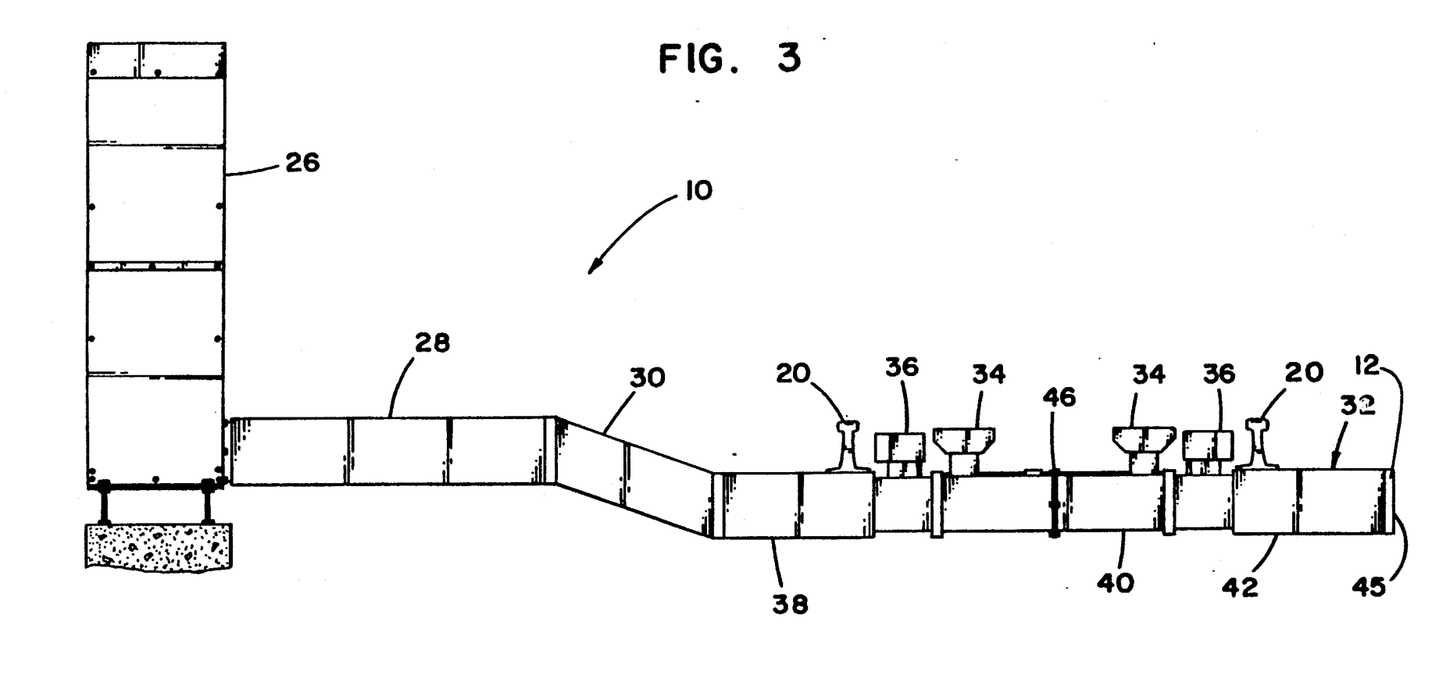
FIG. 3 shows a profile view of the hot air blower-type track switch snow melter.

FIG. 3 shows a profile or side view of the hot air blower 10. This view shows the relative position of the outlet duct 32 and stationary rails 20. Outlet duct 32 is installed parallel to ties 24 and just beneath stationary rails 20. Ducts 28, 30 and 32 are preferably steel. In order to ensure that duct 32 does not create an electrical connection between rails 20, an electrically insulating joint 46 must be placed between oppositely disposed rails 20. Insulating joint 46 is preferably placed in center section 40 of outlet duct 32.

Figure 4A:
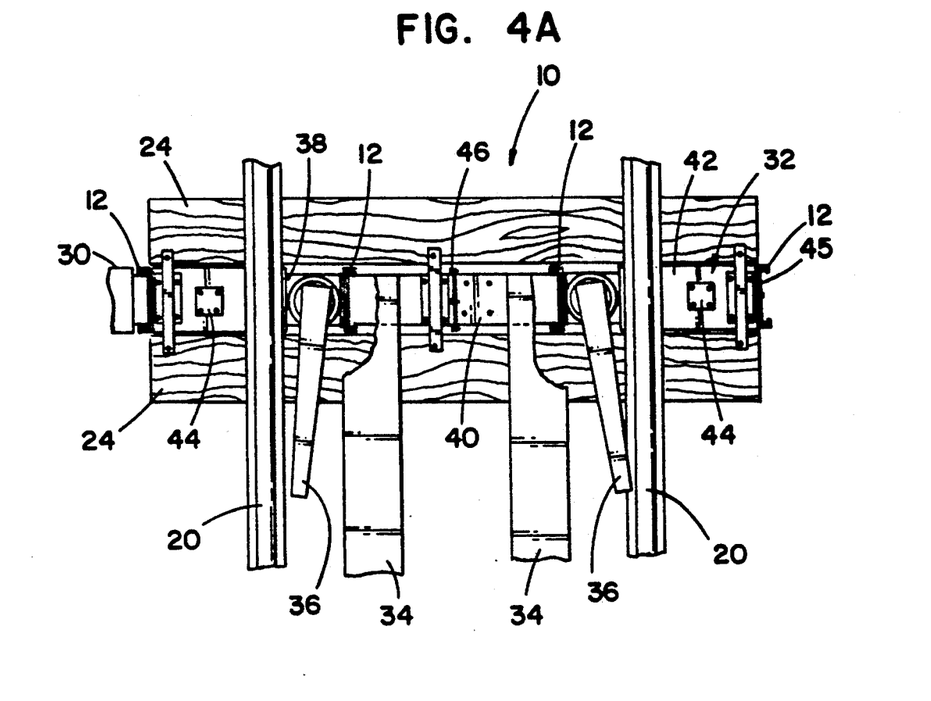
FIG. 4A shows the preferred embodiment of the hot air blower-type track switch snow melter.
Figure 4B:
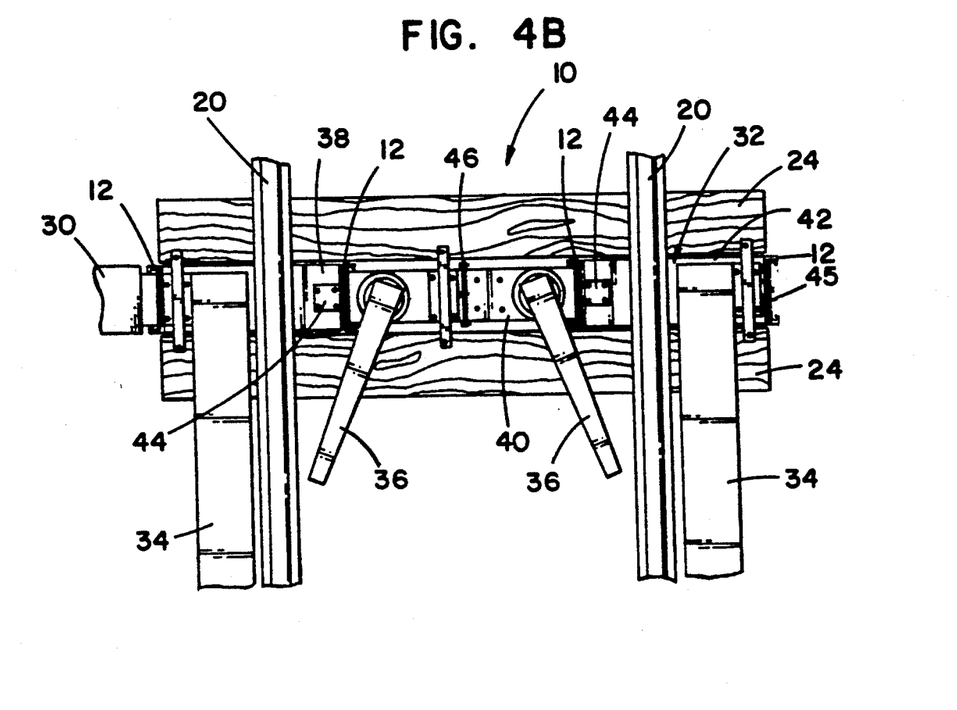
FIG. 4B shows an alternative embodiment of the hot air blower-type track switch snow melter.

FIGS. 4A and 4B show alternate embodiments of the hot air blower 10. In FIG. 4A is the preferred embodiment having track ducts 34 positioned between stationary rails 20. FIG. 4B shows an alterative embodiment having track ducts 34 outside of stationary rails 20. Track ducts 34 are attached to outlet duct 32 at openings revealed by removal of track duct plates 44, as explained previously. In an alternative embodiment, the point nozzles 36 may be attached where track ducts 34 are in the preferred embodiment. In the alternative embodiment, plates 44 cover openings in outlet duct 32 where point nozzles 36 were in the preferred embodiment.

Figure 5:
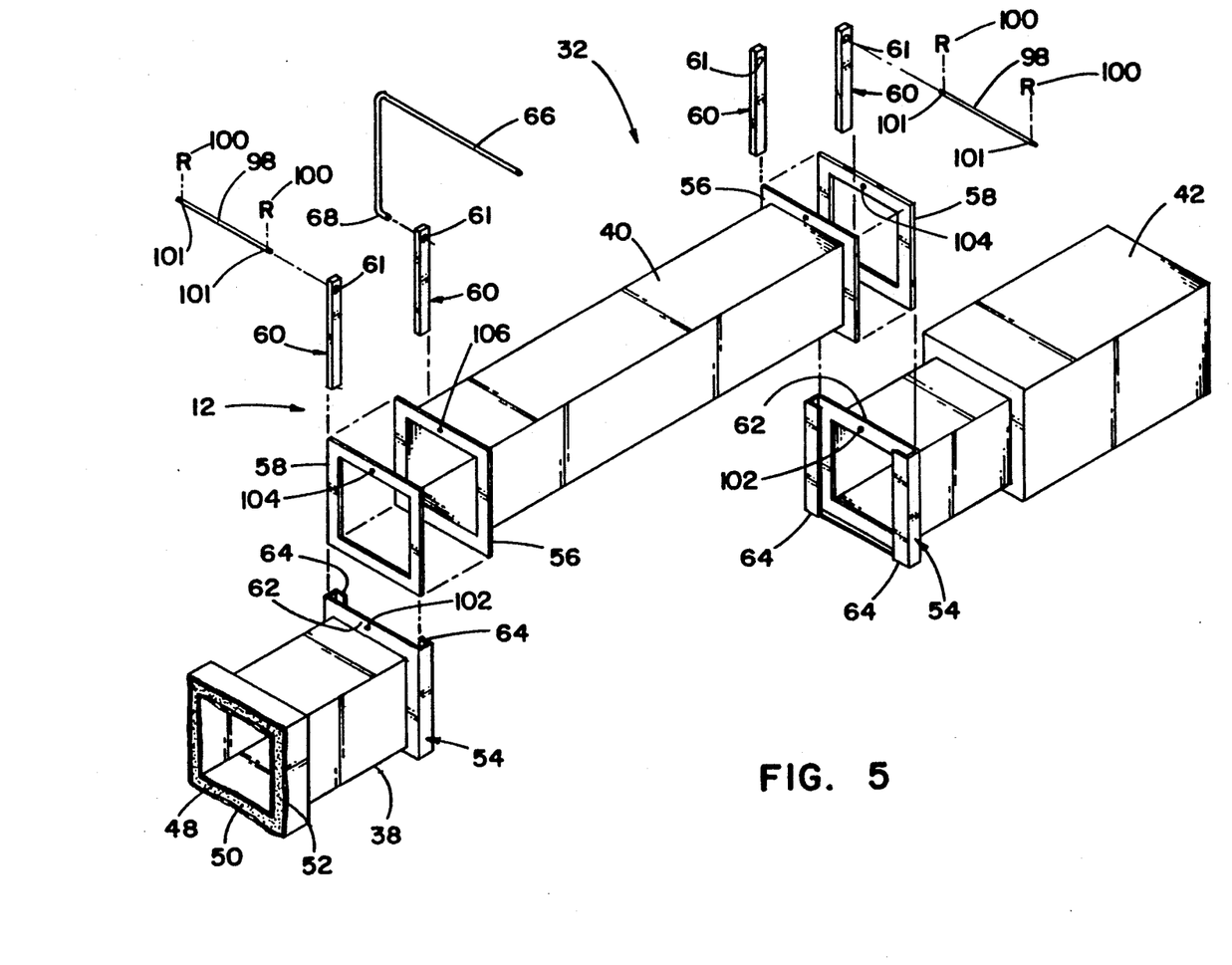
FIG. 5 shows a partial and expanded view of an outlet duct.

FIG. 5 shows a partial and expanded view of outlet duct 32. First section 38 has cam locking joint 12 disposed proximate one end. The opposite end of first section 38 is cut away to reveal the cross section of first section 38. The cross section of first section 38 of outlet duct 32 shown in FIG. 5 includes a duct liner 48, a duct insulation layer 50 and a duct housing 52. Duct liner 48 and duct housing 52 may be steel, galvanized steel, or comparable material. Duct insulation layer 50 is preferably fiberglass. In the preferred embodiment, flame duct 28, offset duct 30, first section 38 of outlet duct 32, and end section 42 of outlet duct 32 are insulated in this way. Center section 40 of outlet duct 32 is preferably not insulated, however, center section 42 may be insulated without departing from the principals of the present invention.

As shown in FIG. 5, the cam locking joint 12 includes a compound flange 54, a single flange 56, a gasket 58, and two cam rods 60. Compound flange 54 and single flange 56 are preferably attached to respective duct ends by welding and with threaded fasteners. In the preferred embodiment, primary flange 62 and single flange 56 are generally rectangular. Compound flange 54 has a primary flange 62 and two oppositely disposed secondary flanges 64. Secondary flanges 64 are generally rectangular elongated members. Compound flange 54, single flange 56, and cam rods 60 are preferably steel.

Gasket 58 is affixed to single flange 56. Gasket 58 is preferably made of ¼" thick highly elastic silicon. Gasket 58 is compressed approximately 50% of its ¼' thickness at approximately 7 psi.

Also shown in FIG. 5 is an L-shaped cam tool 66 having a projecting tip 68. Cam tool 66 is preferably steel.

Cam rod 60 is preferably an elongated rod having a rectangular cross section with rounded corners. Proximate a first end of the rod is an opening 61. In the preferred embodiment, the length of cam rod 60 is approximately the length of secondary flange 64 plus an additional length approximately 2 times the diameter of opening 61. The rectangular cross section of cam rod 60 has a width which allows it to fit loosely between single flange 56 and secondary flange 64 when single flange 56, having gasket 58 is inserted into compound flange 54, as shown on the left side of FIG. 6. The depth of the rectangular cross section of cam rod 60 is sized so that it will fit snugly between single flange 56 and secondary flange 64, as also shown on the right side of FIG. 6.

FIG. 5 also shows a dowel 98 for retaining cam rod 60 in joint 12. When cam rods 60 are holding joint 12 together, dowel 98 is inserted through opening 61 in adjacent cam rod 60. Then cotter pins 100 are inserted into cotter pin openings 101 disposed at opposite ends of dowel 98. When dowel 98 and cotter pins 100 are properly positioned, adjacent rods 60 will be disposed between cotter pins 100.

As shown in FIG. 5, cam locking joint 12 also has three retainer openings 102, 104 and 106 in compound flange 54, gasket 58 and single flange 56, respectively. When joint 12 is assembled, each retainer opening 102, 104 and 106 are axially aligned so that a bolt (not shown) can be inserted through the adjacent openings to resist displacement of single flange 56 relative to compound flange 54. Retainer openings 102, 104 and 106 are preferably 7/16" in diameter.

Figure 9A:
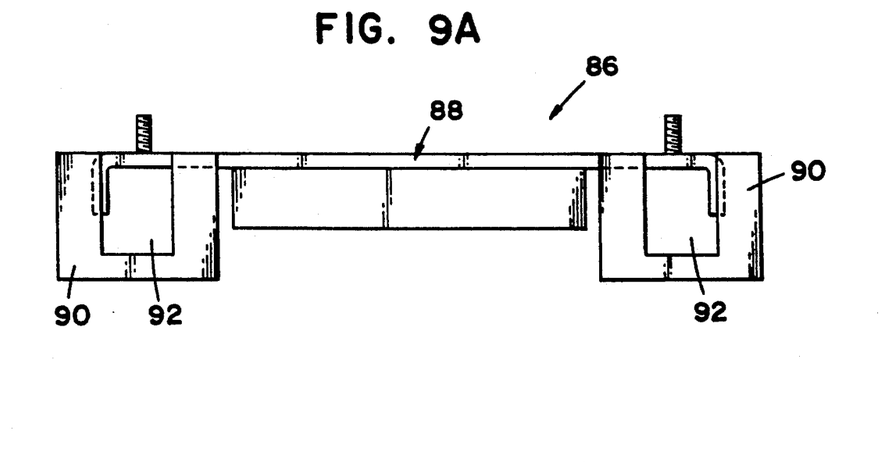
FIG. 9A shows a top view of an alternative embodiment of the cam locking joint.

FIG. 9A shows an alternative embodiment of a compound flange, generally referred to by the numeral 86. Compound flange 86 has a generally rectangular primary flange and four secondary flanges 90 disposed proximately perpendicular to primary flange 88. One secondary flange 90 is disposed at each respective corner of primary flange 88. Each secondary flange 90 has an opening 92.

Figure 9B:
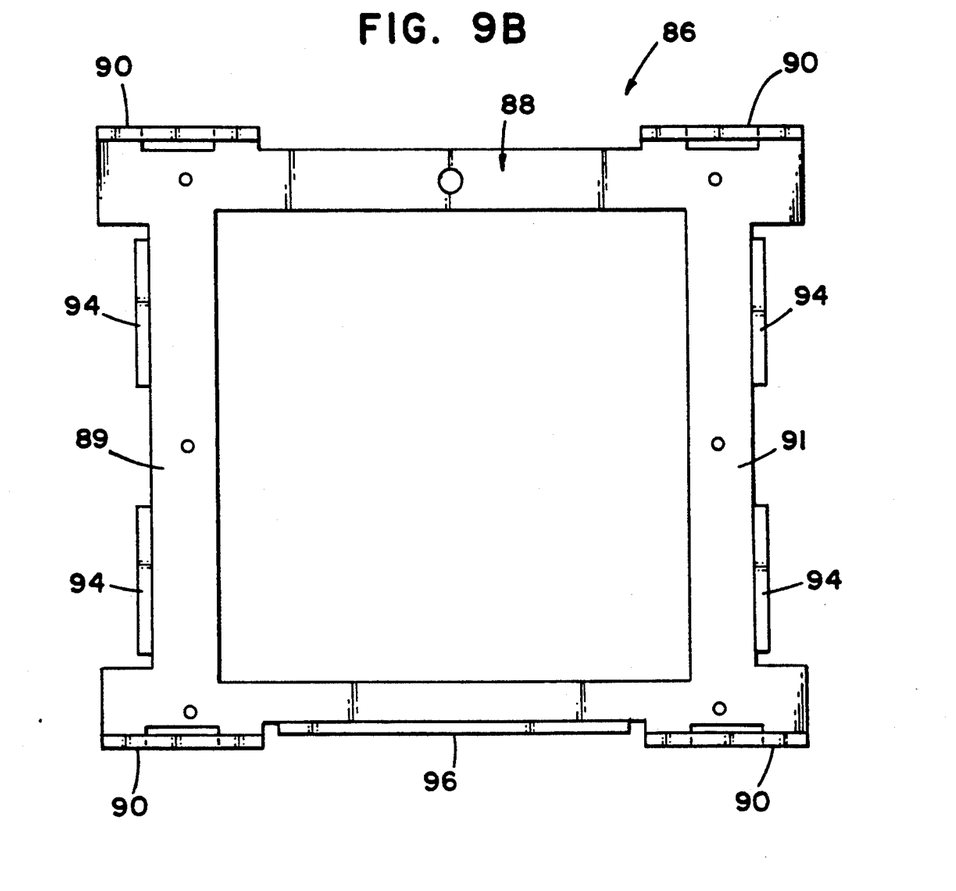
FIG. 9B shows a front view of the alternative embodiment of the cam locking joint.

As shown in FIG. 9B, two secondary flanges 90 are disposed proximately parallel to each other on a first side 89 of primary flange 88. The other two secondary flanges 90 are disposed proximately parallel each other on the second and opposite side 91 of primary flange 88. A central axis through openings 92 of secondary flanges 90 disposed on first side 89 of primary flange 88 is approximately aligned with that side. A central axis through openings 92 in secondary flanges 90 disposed on second opposite side 91 is proximately aligned with second opposite side 91. Also shown in FIG. 9B are a plurality of alignment flanges 94 and 96, disposed proximately perpendicular to primary flange 88.

Figure 10:
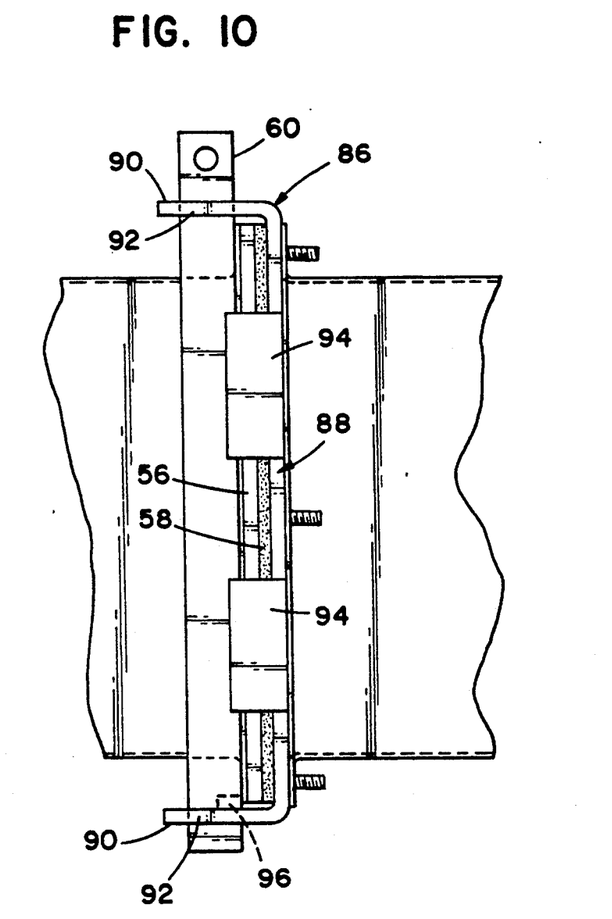
FIG. 10 shows a side view of the alternative embodiment of the cam locking joint joining the ends of adjacent ducts.

In FIG. 10, two ducts are joined using compound flange 86. Single flange 56, having gasket 58, is between alignment flanges 94 and above alignment flange 96. Single flange 56 is also disposed between secondary flanges 90 and cam rods 60 inserted within aligned openings 92 on first side 89 and second side 91. In one embodiment of the invention, the alternative compound flange 86 is used to connect flame duct 28 to blower 26, with the flange 86 being connected to blower 26.

Figure 7:
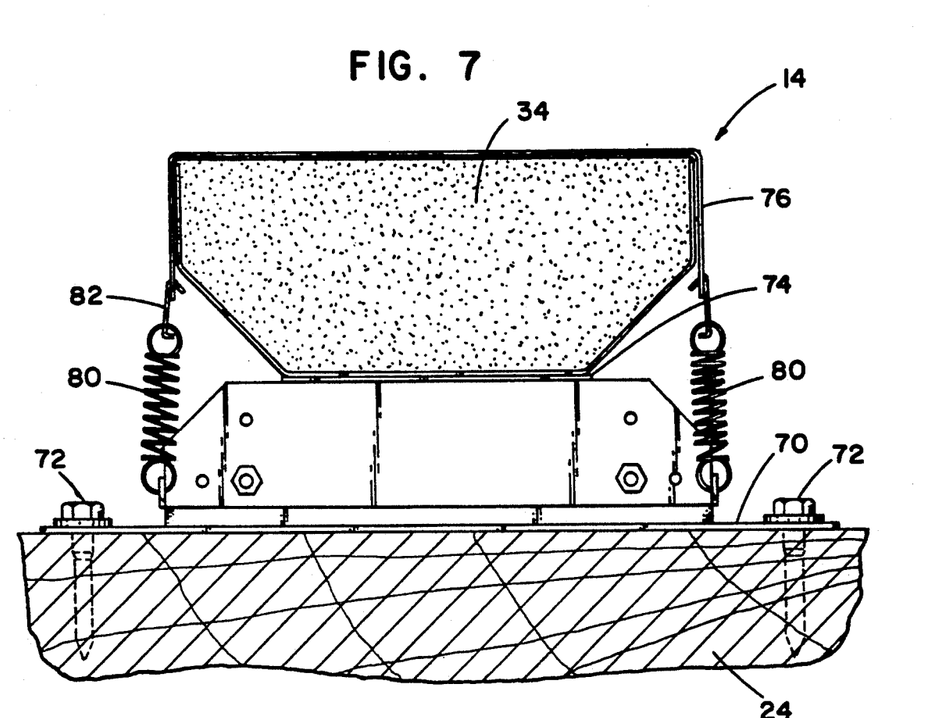
FIG. 7 shows a front view of a track duct support bracket.
Figure 8:
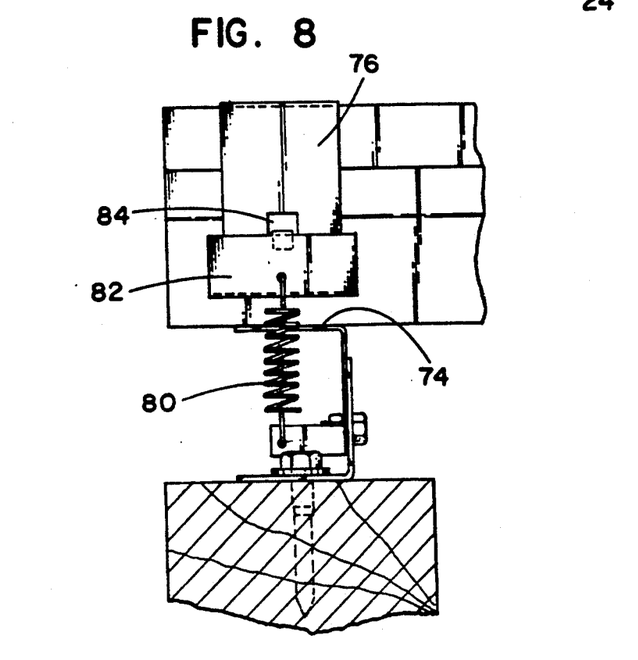
FIG. 8 shows a side view of the track duct support bracket.

FIG. 7 shows a view of the track duct support bracket 14 perpendicular to the length of track duct 34. Track duct support bracket 14 includes a base 70 affixed to tie 24 by lag bolts 72. Track duct 34 is shown resting on lip 74 of base 70. Track duct 34 is secured in place on lip 74 by a hold-down strap 76. The hold-down strap 76 is attached to the base 70 by way of a helical spring 80 having a hook clip 82. One end of each spring 80 is attached to base 70 and the other end of each spring 80 is attached to hook clip 82. Hook clip 82 is designed to be received in an aperture 84 through hold-down strap 76.

In use, the duct work of the hot air blower can be quickly removed from the railway when track maintenance is conducted by using the quick release cam locking joints 12 and track duct support brackets 14. This is done by first removing the track ducts 34 by unfastening the track duct support brackets 14, as described below. Finally, offset duct 30 and outlet duct 32 can be removed. To remove ducts 30 and 32, the quick release joints 12 between flame duct 28 and offset duct 30, offset duct 30 and first section 38, first section 38 and center section 40, and center section 40 and end section 42 are released or unfastened as described below. Offset duct 30 and center section 40 are then lifted out. Then first section 38 and second section 32 may be slid inwardly or outwardly from beneath respective proximate rails 20.

Figure 6:
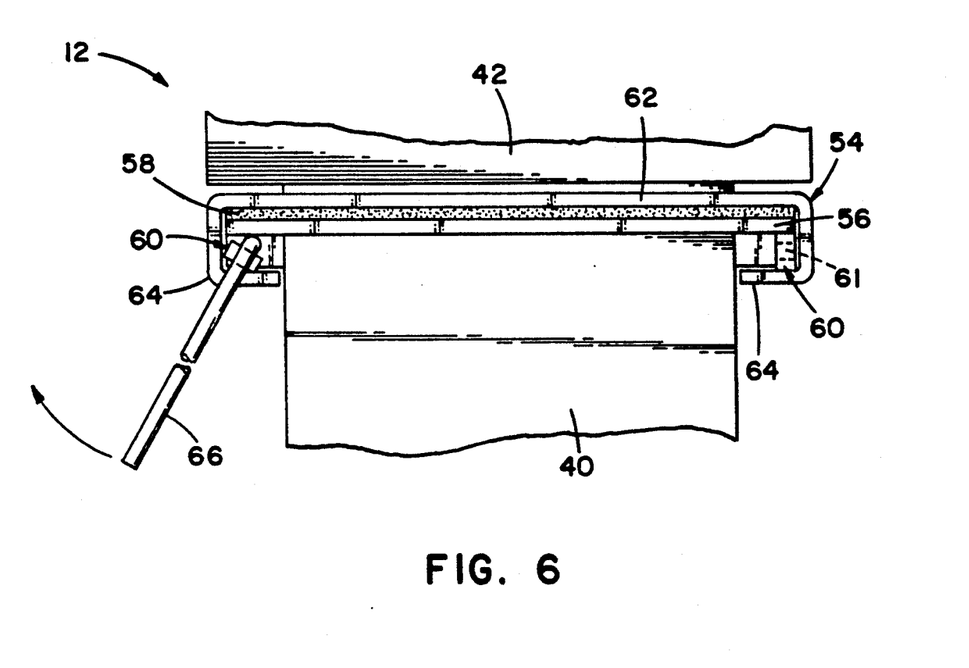
FIG. 6 shows a top view of the cam locking joint.

Cam locking joint 12 is fastened by inserting the single flange 56 between the primary flange 62 and secondary flanges 64 of the compound flange 54, as shown in FIG. 6. Then cam rod 60 is inserted width-wise between single flange 56 and secondary flange 64 so that rod 60 extends proximately the length of flange 64 with opening 61 exposed above flange 64. Once cam rod 60 is in place, tip 68 of cam tool 66 is inserted into opening 61 of cam rod 60. Cam tool 66 is then rotated so that the cross section of cam rod 60 is positioned depth-wise between single flange 56 and secondary flange 64. The depth of the cross section of cam rod 60 is sized so that when cam rod 60 is rotated into this position, gasket 58 is compressed approximately 50%, as described above. Then another cam rod 60 is rotated lengthwise between the oppositely disposed single flange 56 and secondary flange 64, as shown in FIG. 6. This creates a strong, dependable, substantially airtight seal between adjacent ducts.

To unfasten joint 12, tip 68 of cam tool 66 is again inserted into opening 61 of cam rod 60. Cam tool 66 is then rotated so that the cross section of cam rod 60 is rotated from the depth-wise to the widthwise position between single flange 56 and secondary flange 64. This procedure is then repeated with the other cam rod 60. Then cam rods 60 and single flange 56 having gasket 58 easily can be removed from compound flange 54.

Compound flange 86 is fastened and unfastened similarly to the joint using compound flange 54. Single flange 56 is abutted against primary flange 88 of compound flange 86. Single flange 56 is positioned between alignment flanges 94 disposed on first side 89 of primary flange 88 and second side 91 of primary flange 88, and between opposite secondary flanges 90. One cam rod 60 is then inserted through openings 92 in secondary flanges 90 disposed on first side 89 of primary flange 88, and another cam rod 60 is inserted in openings 92 in secondary flanges 90 disposed on second side 91 of primary flange 88. Rods 60 are inserted so that single flange 56 is disposed between rods 60 and primary flange 88. As explained above, the depth of the cross section of cam rod 60 is sized so that when cam rod 60 is rotated, the depth of the cross section of cam rod 60 is approximately perpendicular to primary flange 88. Gasket 58 is compressed approximately 50%.

Track duct support bracket 14 provides for quick attachment and release of track duct 34 from ties 24. To attach track duct 34 to ties 24, the track duct 34 is placed atop lip 74. The hold-down strap 76 is then placed over track duct 34. Hook clips 82 are then lifted toward proximate apertures 84 in hold-down strap 76, partially elongating helical hold-down springs 80. Hook clips 82 are then inserted into apertures 76. The spring, still partially elongated, biases hold-down strap 76 toward base 70. To release tract duct 34, this procedure is reversed.

Although characteristics and advantages, together with details of structure, function and process steps, have been described in reference to a preferred embodiment herein, it is understood that the disclosure is illustrative. To that degree, various changes made, especially in matters of shape, size and arrangement, to the full extent extended by the general meaning of the terms in which the appended claims are expressed, are within the principal of the present invention.

What is claimed is:

1. A quick release cam locking joint for joining two conduits, the joint comprising:
   a single flange proximate one end of a first conduit;
   a compound flange proximate one end of a second conduit, the compound flange having a primary flange and a plurality of secondary flanges with at least a portion of each secondary flange being disposed spaced apart from the primary flange, wherein the single flange is inserted between the primary flange and the secondary flanges; and
   means for camming being inserted between the single flange and each of the secondary flanges, the means for camming being rotated to push against the secondary flanges and push the single flange toward the primary flange to join the first conduit with the second conduit.

2. The quick release cam locking joint in accordance with claim 1, wherein the single flange includes a gasket for creating a seal between the single flange and the primary flange.

3. The quick release cam locking joint in accordance with claim 1, wherein the single flange and the primary flange are generally rectangular.

4. The quick release cam locking joint in accordance with claim 1, wherein the camming means includes a cam rod, the cam rod having a cross-sectional width shorter than a cross-sectional depth, the cross-sectional width being forced to push against the secondary flanges and push the single flange toward the primary flange after the camming means is rotated.

5. The quick release cam locking joint in accordance with claim 1, wherein the portion of each secondary flange is generally parallel to the primary flange.

6. A quick release cam locking joint for joining adjacent ducts of a hot air blower type track switch snow melter, the joint comprising:

a plurality of cam rods, each rod having a longitudinal axis and a cross-sectional depth perpendicular to the longitudinal axis greater than the rod's cross-sectional width perpendicular to the longitudinal axis;

a single flange proximate one end of a first duct;

a compound flange proximate one end of a second duct, the compound flange having a primary flange and a plurality of secondary flanges disposed spaced apart from the primary flange; wherein the single flange is inserted between the primary flange of the compound flange and the plurality of secondary flanges, and one cam rod is inserted between each secondary flange and the single flange whereby the cross-sectional depth faces toward the primary flange so that the cam rod can be rotated about the longitudinal axis to push the cross-sectional width of the cam rod against the secondary flanges and force the single flange toward the primary flange to join the first duct with the second duct.

7. The quick release cam locking joint for joining ducts of a hot air blower type track switch snow melter in accordance with claim 6, wherein the single flange includes a gasket for creating a seal between the single flange and the primary flange.

8. The quick release cam locking joint for joining ducts of a hot air blower type track switch snow melter, in accordance with claim 6, wherein each of the plurality of cam rods includes an aperture for inserting a cam rod rotating tool.

9. The quick release cam locking joint for joining ducts of a hot air blower type track switch snow melter, in accordance with claim 6, wherein the single flange and the primary flange are generally rectangular.

10. A quick release cam locking joint in accordance with claim 6, wherein a portion of each of the secondary flanges is generally parallel to the primary flange.

11. A quick release cam locking joint for joining ducts of a hot air blower type track switch snow melter, the joint comprising:

a plurality of cam rods, each cam rod having a longitudinal axis and a cross-sectional depth perpendicular to the longitudinal axis greater than the rod's cross-sectional width perpendicular to the longitudinal axis;

a generally rectangular compound flange proximate one end of a second duct, the compound flange having a primary flange and a plurality of secondary flanges disposed generally away from the second duct, at least two of the secondary flanges being disposed at a first side of the primary flange, and at least two secondary flanges being disposed at a second side of the primary flange, each secondary flange having an opening, the openings through the secondary flanges disposed to the first side being axially aligned with each other, and the openings through the secondary flanges disposed to the second side being axially aligned with each other; wherein the single flange is inserted between the secondary flanges disposed on the first side and the second side so that one cam rod is inserted through the axially aligned openings on the first side whereby the cross-sectional depth faces toward the primary flange, and another cam rod is inserted through the axially aligned openings on the second side whereby the cross-sectional depth faces toward the primary flange, each rod then being rotated about the longitudinal axis to push against the secondary flanges and force the single flange toward the primary flange by the cross-sectional width of the cam rod to join the first duct with the second duct.

* * * * *

UNITED STATES PATENT AND TRADEMARK OFFICE
CERTIFICATE OF CORRECTION

PATENT NO. :  5,333,912

DATED     :  August 2, 1994

INVENTOR(S) :  David K. Fox

It is certified that error appears in the above-identified patent and that said Letters Patent is hereby corrected as shown below:

In Column 4, line 8, "¼' " should read --¼" --.
In Column 8, line 11, Claim 11, insert --a generally rectangular single flange proximate one end of a first duct-- after the clause ending with the word "axis; ".

Signed and Sealed this

Twenty-fifth Day of July, 199

Attest:

BRUCE LEHMAN

Attesting Officer

Commissioner of Patents and Trademarks